United States Patent
Chandan et al.

(10) Patent No.: US 8,606,267 B2
(45) Date of Patent: Dec. 10, 2013

(54) USING THE IMSI VALUE FROM THE SIM CARD DATA TO MAKE AN EXTERNAL CALL

(75) Inventors: Akhil Chandan, Ottawa (CA); Alexander Afros, Kitchener (CA); Lap Luu, Markham (CA)

(73) Assignee: BlackBerry Limited, Waterloo Ontario (CA)

( * ) Notice: Subject to any disclaimer, the term of this patent is extended or adjusted under 35 U.S.C. 154(b) by 296 days.

(21) Appl. No.: 13/036,961

(22) Filed: Feb. 28, 2011

(65) Prior Publication Data

US 2012/0220281 A1    Aug. 30, 2012

(51) Int. Cl.
*H04W 4/00* (2009.01)
(52) U.S. Cl.
USPC ...... 455/432.1; 455/558; 455/418; 455/432.3
(58) Field of Classification Search
USPC .............................. 455/558, 418, 432.1, 432.3
See application file for complete search history.

(56) References Cited

U.S. PATENT DOCUMENTS

| | | | |
|---|---|---|---|
| 2004/0131172 A1* | 7/2004 | Gill | 379/265.02 |
| 2006/0177043 A1* | 8/2006 | Li et al. | 379/355.08 |
| 2007/0178896 A1* | 8/2007 | Kim | 455/432.1 |
| 2007/0213075 A1 | 9/2007 | Jiang | |

FOREIGN PATENT DOCUMENTS

| | | |
|---|---|---|
| EP | 2268090 A2 | 12/2010 |
| WO | 2008076031 A1 | 6/2008 |

OTHER PUBLICATIONS

Extended EP Search Report for EP Application No. 12157365.3 dated Apr. 26, 2012.

* cited by examiner

*Primary Examiner* — Justin Lee
(74) *Attorney, Agent, or Firm* — Jon A. Gibbons; Fleit Gibbons Gutman Bongini & Bianco PL (57) ABSTRACT

A method and apparatus are disclosed for a network node which processes a call request from an enterprise user's mobile device to initiate origination of an outgoing cellular call to a called party by making an external call to the mobile device which does not have a country code encoded in its SIM card by transforming an International Mobile Subscriber Identity (IMSI) value from the SIM card into a country code value, and then using the country code value to construct a dialing sequence for calling the mobile device.

20 Claims, 7 Drawing Sheets

USING THE IMSI VALUE FROM THE SIM CARD DATA TO MAKE AN EXTERNAL CALL

BACKGROUND OF THE INVENTION

1. Field of the Invention

The present disclosure is directed in general to mobile communication devices operative in wireless communication networks. In one aspect, the present disclosure relates to the methods, systems and devices for making external phone calls to mobile communication devices.

2. Description of the Related Art

Mobile communication devices provide a wide range of capabilities and functionalities to the user, such as sending and receiving telephone calls, electronic messages and instant messages. In addition, mobile devices typically include capabilities defined by the different applications which are installed in the mobile device, such as voice telephony applications, a data or message synchronization applications (e.g. for e-mail messages or calendar items), a Web browser or Internet search applications, as examples, or combinations thereof In the case of telephone communications, a mobile device may be capable of making and receiving calls through both a PBX or enterprise domain (possibly administered by the user's place of employment) and through other non-enterprise domain(s), such as a wireless wide area networks, personal cellular service, and the like. In support of making calls to and from a mobile device, a subscriber identity module (SIM) card is mounted to the mobile device as a smart card that includes a processor and a memory chip for storing and processing predetermined subscriber information and information loaded in a pre-personalization state. However, depending on what information is stored on the SIM card, the mobile device may not be able to make or receive a call when traveling outside of the service area associated with the SIM card. For example, when a mobile device in an enterprise network does not have country code information encoded in its SIM card, the enterprise network server cannot construct the required dialing code for an international call to the mobile device without the country code information from the SIM card. For example, in Hong Kong, local SIM cards do not encode the Hong Kong Country code (852). Similarly, SIM cards in Canada do not encode the country code (1) before the local number. As a result, an international call from Canada made by the enterprise server to a mobile device in Hong Kong cannot be made by the PBX when the SIM card at the mobile device does not include the encoded country code for Hong Kong.

Accordingly, a need exists for improved method, system and device for overcoming the problems in the art, such as outlined above, where the same or similar problems may exist in other networks and devices. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

A method, system and device are provided for making external calls to a mobile device which does not have a country code encoded in its SIM card by transforming an International Mobile Subscriber Identity (IMSI) value from the SIM card into a country code value, and then using the country code value to construct a dialing sequence for calling the mobile device. As disclosed, a communication network server supports calls to or from a mobile device without country code information encoded in the SIM card (e.g., the Mobile Subscriber Integrated Services Digital Network Number (MSISDN) by deriving or constructing country code information from other SIM card data (e.g., the IMSI element), and then constructing a dialing sequence to the mobile device using the constructed country code information so that a call switching node (e.g., PBX) can establish an outgoing call to the mobile device using the dialing sequence. In selected embodiments, the communication network server constructs the country code information when a mobile device without a country code encoded in the SIM card attempts to place a fixed mobile convergence call that requires a mobile terminated dialog to the mobile device. If the mobile device is outside the enterprise-controlled network and the country code field is not included in the mobile device's SIM data, the communication network server derives or constructs the country code by extracting a mobile country code (MCC) from other SIM card data (e.g., the IMSI element), and then translating the extracted MCC into a constructed country code for the mobile device, such as by using a table lookup operation. The constructed country code may be stored with the SIM data from the mobile device and also inserted into the mobile number for use in constructing dialing sequences to the mobile device to enable PBX-initiated calls to the mobile device over a wide-area cellular network. In this way, the communication network server uses the IMSI value to construct the country code of the mobile number so that long distance calls can be placed to the mobile number of the mobile device.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the device designer's specific goals, such as compliance with communication system limits or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present disclosure. In addition, some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
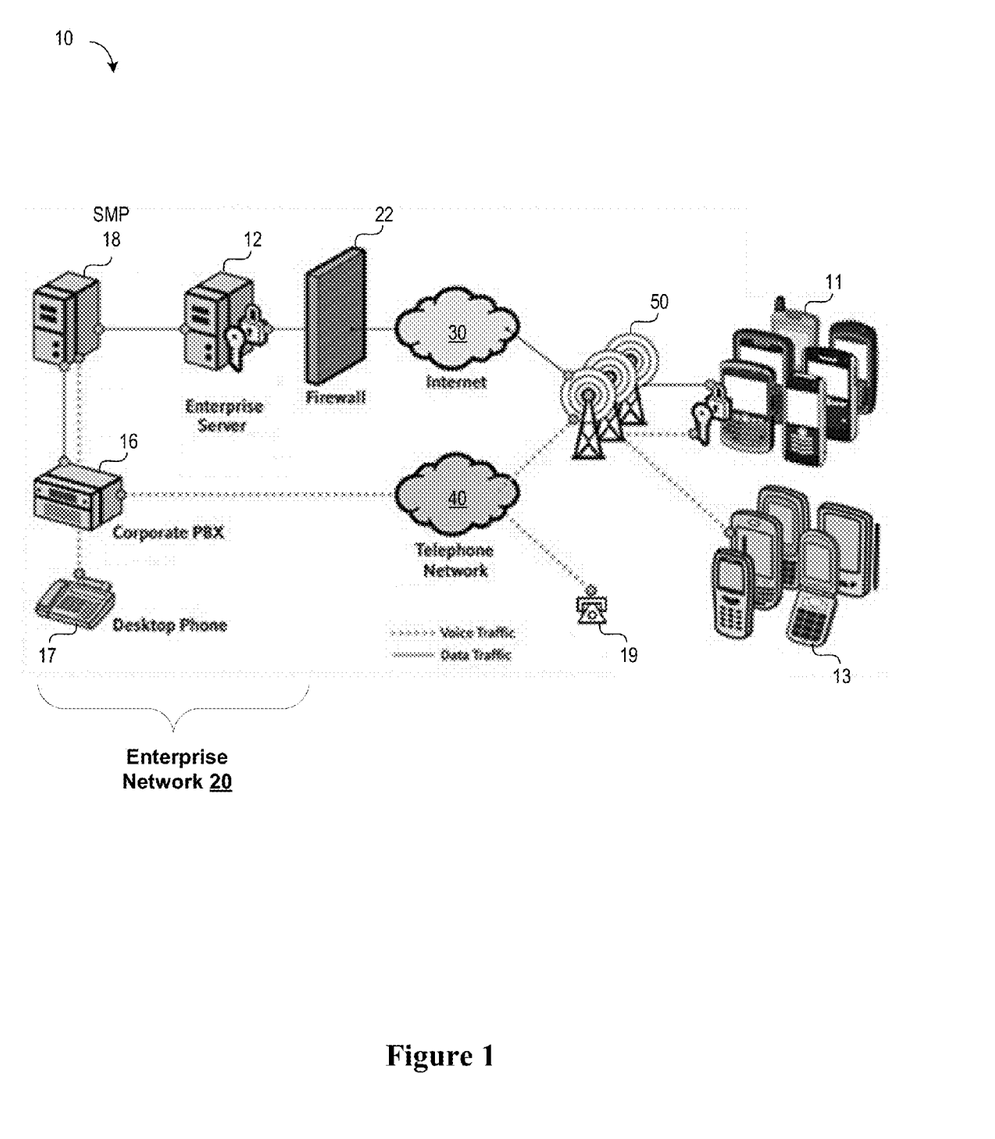
FIG. 1 is a schematic block diagram representation of an example system for managing enterprise-related mobile calls, including an enterprise communications platform for making calls to a mobile device.

Referring now to FIG. 1, there is depicted is a schematic block diagram representation of an example system 10 for control and management of enterprise-related mobile calls, including an enterprise communications platform for making calls to a mobile device. The system 10 includes an enterprise or business system 20 which may be embodied as a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. As known in the art, the connection with the PLMN 50 may be made via a relay (not shown).

The system 10 may include a number of enterprise-associated mobile devices 11. Each of the mobile devices 11 may be equipped for cellular communication through the PLMN 50, and/or may be equipped for Wi-Fi communications over one or more wireless local area network (WLAN) configured in accordance with one of the IEEE 802.11 specifications.

As described more fully below, each of the mobile devices 11 may include one or more radio transceivers and associated processing hardware and software to enable wireless communications with the PLMN 50 and/or one of the WLANs. In this way, the PLMN 50 and mobile device(s) 11 may be configured to operate in compliance with any one or more of a number of wireless protocols, including GSM, GPRS, CDMA, EDGE, UMTS, EvDO, HSPA, 3GPP, or a variety of others. It will be appreciated that each mobile device 11 may roam within the PLMN 50 and across PLMNs, in known manner, as the user moves. In some instances, dual-mode mobile devices 11 and/or the enterprise network 20 are configured to facilitate roaming between the PLMN 50 and a WLAN, and are thus capable of seamlessly transferring sessions (such as voice calls) from a connection with the cellular interface of the dual-mode device 11 to the WLAN interface of the dual-mode device 11, and vice versa.

The enterprise network 20 typically includes a number of networked servers, computers, and other devices. For example, the enterprise network 20 may connect one or more desktop or laptop computers (not shown) and/or desktop telephones 17, where the connections may be wired or wireless.

Though not separately shown, the enterprise network 20 may include one or more mail servers for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server. The messages may be retrieved by the user using a messaging application, such as an e-mail client application. The messaging application may be operating on a user's computer connected to the enterprise network 20 within the enterprise. In some embodiments, the user may be permitted to access stored messages using a remote computer. Using the messaging application, the user may also compose and send messages addressed to others, within or outside the enterprise network 20. The messaging application causes the mail server to send a composed message to the addressee.

The enterprise network 20 may also include an enterprise server 12. Using a relay, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the enterprise network 20 or elsewhere. In this way, the enterprise server facilitates "push" e-mail service for the mobile device 11 enabling the user to send and receive e-mail messages using the mobile device 11 as though the user were connected to an e-mail client within the enterprise network 20 using the user's enterprise-related e-mail address.

The enterprise network 20 also includes a Private Branch eXchange (PBX) 16, such as a standard PBX or an IP-PBX, that is connected with the telephone network 40 for routing incoming and outgoing voice calls for the enterprise. The PBX 16 may be connected to the PSTN 40 via DID trunks or PRI trunks, for example. In addition, the PBX 16 may use ISDN signaling protocols for setting up and tearing down circuit-switched connections through the PSTN 40 and related signaling and communications. In some embodiments, the PBX 16 may be connected to one or more conventional analog telephones 17. The PBX 16 is also connected to the enterprise network 20 and, through it, to telephone terminal devices, such as digital telephone sets, softphones operating on computers, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively, the SMP 18 and PBX 16 may be referred to as the enterprise communications platform. It will be appreciated that the enterprise communications platform and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component or as part of the enterprise server 12. As will be described below, the SMP 18 may be implemented as a multi-layer platform.

The enterprise communications platform 16, 18 implements the switching to connect session legs and may provide the conversion between, for example, a circuit-switched call and a VoIP call, or to connect legs of other media sessions. In some embodiments, in the context of voice calls the enterprise communications platform 16, 18 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 16, 18, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 16, 18 is to extend the features of enterprise telephony to the mobile devices 11. For example, the enterprise communications platform 16, 18 may allow the mobile device 11 to perform functions akin to those normally available on a standard digital or analog telephone set 17. Example features may include direct extension dialing, enterprise voice mail, conferencing, call transfer, call park, etc.

Figure 2:
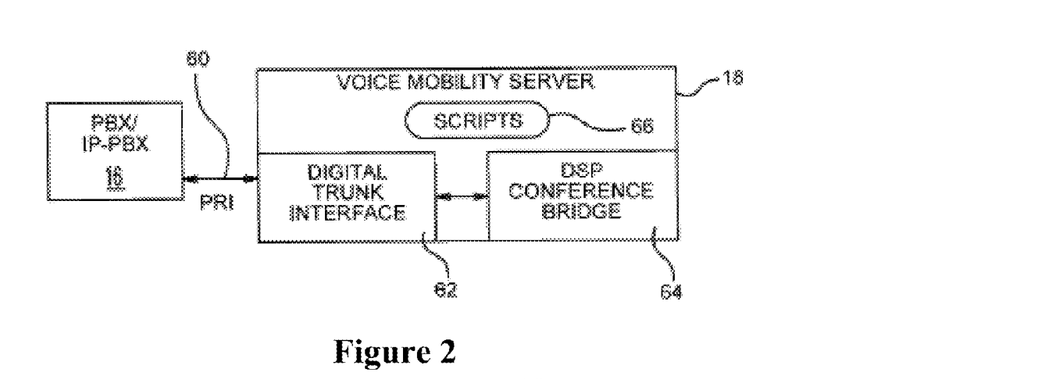
FIG. 2 shows a schematic block diagram representation of a first embodiment of the enterprise communications platform.

Referring now to FIG. 2, there is shown a schematic block diagram representation of a first embodiment of the enterprise communications platform intended for use in a circuit-switched TDM context where the SMP 18 operates as a voice mobility server. As described below, it will be appreciated that the references to "calls" or call-centric features are applicable to session-based communications in general and, in some instances, to messaging-based communications. As depicted, the PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control." Many of the media handling functions normally implemented by the PBX 16 are handled by the SMP 18 in this architecture. Incoming calls addressed to any extension or direct dial number within the enterprise, for example, are always first routed to the SMP 18. Thereafter, a dialog is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor. The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

Figure 3:
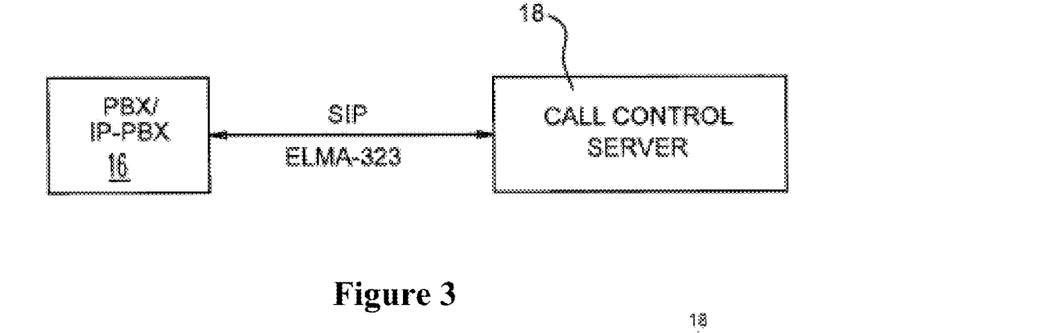
FIG. 3 shows a schematic block diagram representation of a second embodiment of the enterprise communications platform.

Referring now to FIG. 3, there is shown a schematic block diagram representation of a second embodiment of the enterprise communications platform in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control." As depicted, the call control server 18 is coupled to the PBX 16, for example through the LAN, enabling packet-based communications and, more specifically, IP-based communications. In selected embodiments, communications between the PBX 16 and the call control server 18 are carried out in accordance with SIP so that the call control server 18 uses SIP-based communications to manage the set up, tear down, and control of media handled by the PBX 16. In other embodiments, the call control server 18 employs a communications protocol conforming to the ECMA-269 or ECMA-323 standards for Computer Supported Telecommunications Applications (CSTA).

Figure 4:
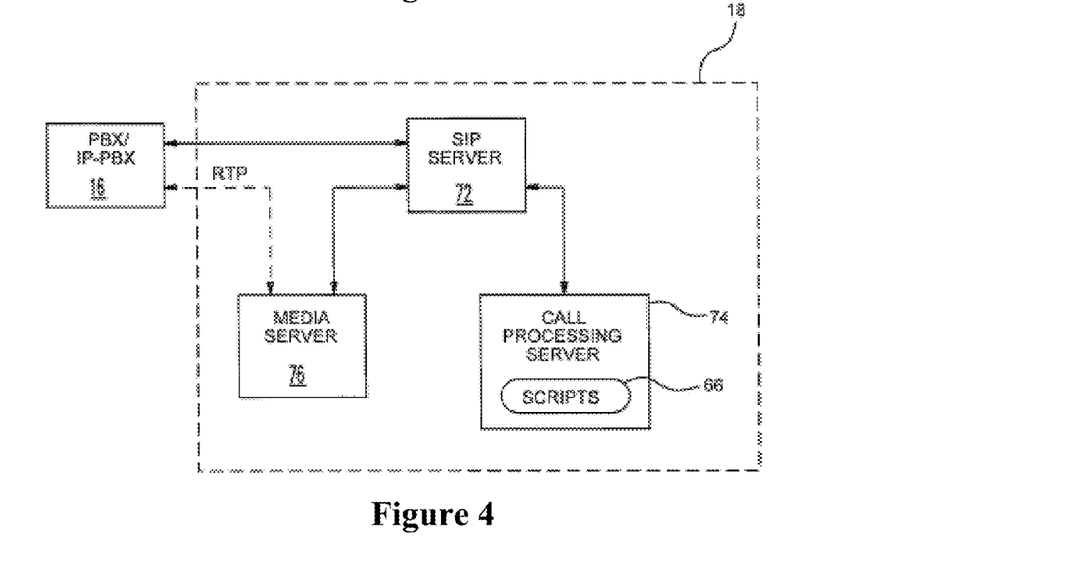
FIG. 4 shows a schematic block diagram representation of a third embodiment of the enterprise communications platform.

Referring now to FIG. 4, there is shown a schematic block diagram representation of a third embodiment of the enterprise communications platform which reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA- 323 standards. These standards prescribe XML based messaging for implementing Computer Supported Telecommunications Applications (CSTA). The SIP server 72 may interact with the media server 76 using SIP-based media handling commands.

Figure 5:
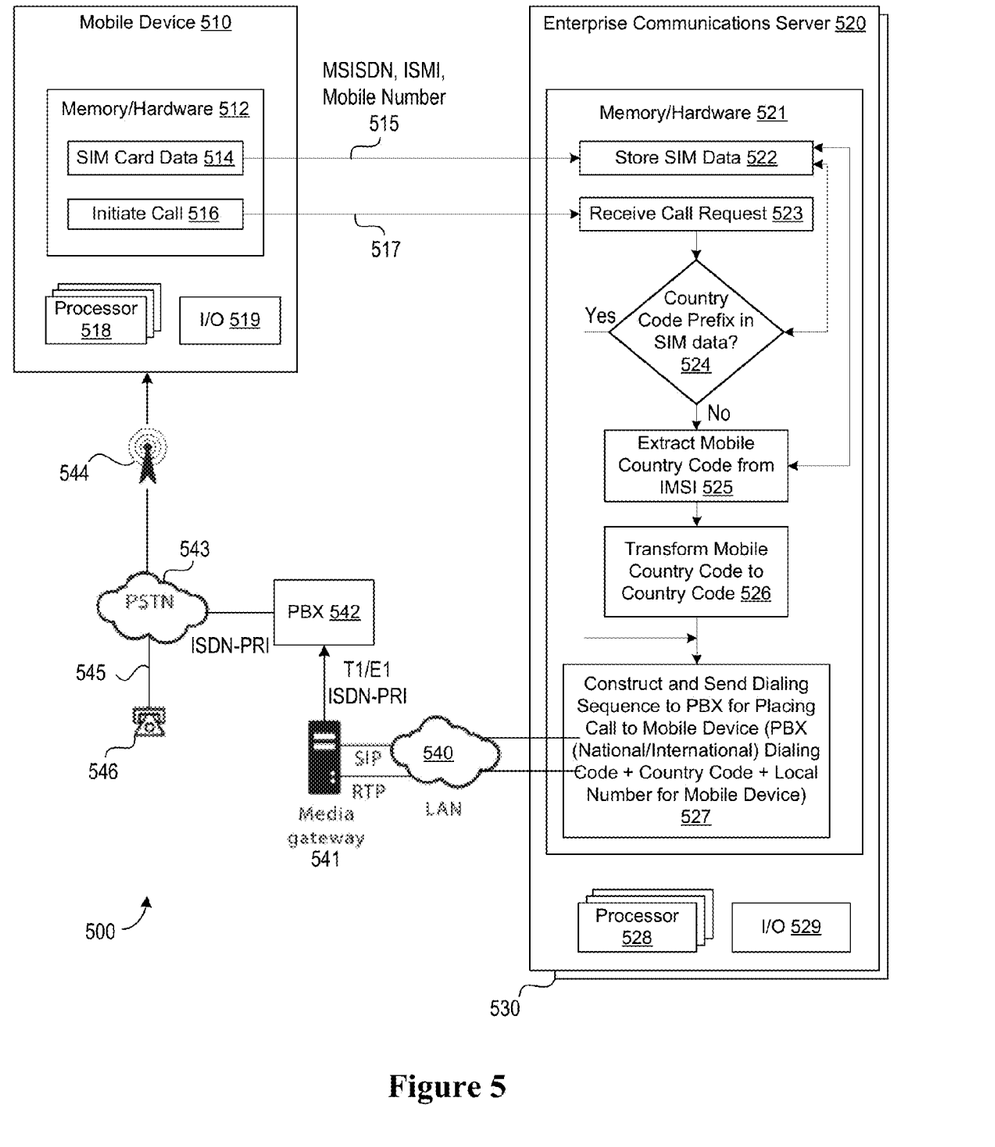
FIG. 5 is a schematic diagram showing components of a communication system which uses IMSI values from the SIM card of a mobile device to make calls to the mobile device.

To understand how the predetermined IMSI value from the SIM card of a mobile device can be used to make an external call to the mobile device, reference is now made to FIG. 5 which schematically depicts a communication system 500 in which an enterprise communications server 520 places a call or call-back to a mobile device 510 which is not encoded with country code information.

To support wireless communications, the depicted mobile device 510 includes one or more processors 518 that run one or more software programs or modules embodied in circuitry and/or non-transitory storage media device(s) 512 (e.g., RAM, ROM, flash memory, etc.) for performing various communication-related operations using dedicated input/output (I/O) circuitry 519. For example, when a SIM card is first installed, the mobile device 510 is configured during bootup to transmit the SIM card data 514 in an uplink message 515 to the enterprise communications server 520. The uplink SIM card data message 515 may include the MSISDN field which is used to identify a mobile phone number internationally with a defined numbering plan to uniquely identify the mobile device 510, including a country code (CC) field, a national destination code (NDC) field, and a subscriber number (SN) field of up to 15 digits in total. In addition, the uplink SIM card data message 515 may include up to 15 digits of an IMSI field which includes a Mobile Country Code (MCC) field, a Mobile Network Code (MNC) field, and the mobile station identification number (MSIN) within the networks customer base. At the enterprise communications server 520, the SIM data is stored in memory 521 by the SIM data storage module 522 for purposes of identifying the subscriber of the mobile device 510 and processing calls as described more fully hereinbelow.

The mobile device 510 is also configured to process incoming and outgoing calls using predetermined call processing operations. For example, an enterprise user using the mobile device 510 may initiate a call to a called party 546 by sending a request message 517 to a serving network node, such as the enterprise communications server 520 or other enterprise data server 530 which mediates the request message 517. For example, when placing an outgoing call, the mobile device 510 may be configured to initiate a call sequence 516, such as by sending a request 517 over a data channel (e.g., SMS, SIP, USSD or IP-based message) to the enterprise communications server 520 to initiate an outgoing call to a called party.

Upon receiving the request message 517 from the mobile device 510 (receive module 521), the service logic at the enterprise communications server 520 may be configured to use the received information to effectuate two dialogs in association with a call switching node, such as a SIP-capable PBX/CENTREX node 542. The first dialog will be set up between the call switching node 542 and the mobile device 510, and the second dialog will be established between the called party's phone (e.g., phone 546) and the call switching node 542 so that the enterprise user's enterprise address is presented to the called party instead of the non-enterprise address associated with the mobile device (i.e., the cellular number). The second dialog is established when the enterprise communications server 520 constructs and sends a first dialing sequence to the PBX 542 for placing the second leg of the call from the PBX 542 to the called party 546 using the called number provided by the mobile device 510 in the call request 517.

To establish the first leg—also referred to as a "mobile terminated" call or a PBX-initiated call—the enterprise communications server 520 retrieves the stored SIM data 522 for the calling party/mobile device 510. If the retrieved SIM data includes the Country Code prefix (affirmative outcome to decision 524), then the call request is processed as normal at step 527 by constructing and sending a dialing sequence to the PBX 542 for placing the first leg of the call to the mobile device 510 using any required national or international dialing code for the PBX, along with the retrieved Country Code prefix and local number for the mobile device 510.

However, if the retrieved SIM data does not include the Country Code prefix (negative outcome to decision 524), this means that the mobile device's SIM card is not encoded with the Country Code. This can happen, for example, in Hong Kong where local SIM cards are not encoded with Hong Kong's Country Code (852) since Hong Kong is not officially recognized as a country apart from China. Another example is in Canada where some SIM cards are not encoded with the Canada country code (1) before the local number.

In an example sequence, the enterprise communications server 520 checks to see if the mobile number (from the stored SIM data 522) contains a Country Code prefix by comparing the prefix of the local number with the Country Code prefix (e.g., with a string comparison). Any match will indicate that the mobile number contains the Country Code. On the other hand, if there is not a match, this indicates that the mobile number does not contain the Country Code since the local number will not start with the country code sequence, in which case the enterprise communications server 520 can insert the Country Code prefix to the local number.

If the SIM card for the mobile device 510 is not encoded with the country code and only has a local number, the enterprise communications server 520 cannot establish the first leg call to the mobile device 510 if the mobile device 510 and the PBX 542 are in different countries because the dialing sequence for the first leg call requires the Country Code for the mobile device 510 or the PBX 542 cannot make the first leg call.

To address the missing country code problem, the enterprise communications server 520 is configured to read the International Mobile Subscriber Identity (IMSI) value from the stored SIM data 522. The 15 digit IMSI value typically includes a Mobile Country code (MCC), Mobile Network Code (MNC) and Mobile station identification number (MSIN). From the IMSI value, the enterprise communications server 520 extracts the MCC code (step 525) and then transforms the MCC value into a Country Code value for the mobile device 510 (step 526). In an example implementation, the PBX 542 is located in the USA and the mobile device 510 includes a Vodafone UK SIM Card having a phone number of 13701827788. Based on the MCC sent from the mobile device 510 (234.XXX.XXXXXXXXX), the enterprise communications server 520 recognizes that this SIM card is in UK with country code 44, and also recognizes that the phone number 13701827788 is just a mobile number that does not have the country code in front of it. As a result, the enterprise communications server 520 constructs the following dialing sequence: 011 (IDD of USA)+44 (UK Country code)+wireless phone number (13701827788). In this example, it will be noted that the United Kingdom has wireless numbering plan that is similar to China's numbering plan where each wireless carrier has its own "area" code. As a result the "1-370-XXXXX" dialing sequence belongs to a Vodafone UK numbering block.

Thus, the MCC value is transformed by using the MCC value to access a table list to obtain or construct the corresponding Country Code value. The constructed Country Code may then be stored in the SIM data 522 as part of the mobile number for the mobile device 510. At this point, the call request may be processed step 527 by constructing and sending a dialing sequence to the PBX 542 for placing the first leg of the call to the mobile device 510 using any required national or international dialing code for the PBX, along with the constructed Country Code prefix and local number for the mobile device 510.

Once the dialing sequences for the first and second legs are constructed, the enterprise communications server 520 sends the dialing sequences for the first and second dialogs as SIP calls to the gateway 541 over the LAN 540. The media gate way converts the SIP call to ISDN and sends the call to the PBX 542. Thereafter, the first and second dialogs are patched together at the PBX 542. For example, the two respective Session DescriptionProtocol (SDP) streams associated with the dialogs are joined in order to establish an end-to-end bearer communications path between the mobile device 510 and the called party 546. In this way, the PBX 542 sends the first dialog over the telephone network 543 to the mobile device/calling party 510 via wireless network 544, and sends the second dialog over the telephone network 543 to the called party 546 via call link 545.

Figure 6:
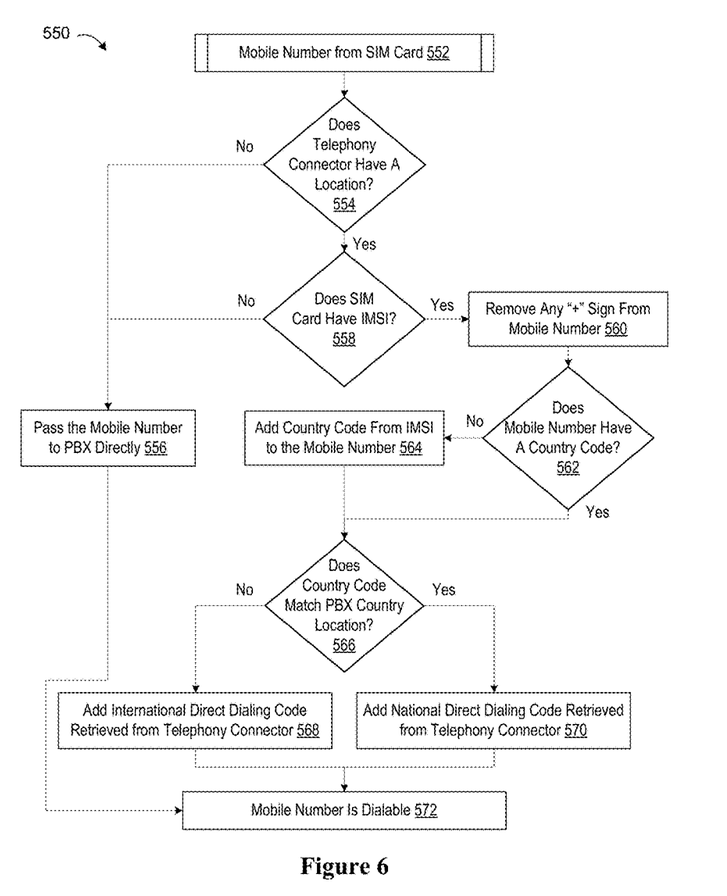
FIG. 6 depicts in flow chart form a procedure for constructing a dialable callback number.

Referring now to FIG. 6, there is depicted in flow chart form a procedure or algorithm 550 for constructing a dialable callback number. After an initial step 552, the mobile number that is to be called back is retrieved from the SIM card data. If it is determined that there is no location for the telephony connector (negative outcome to decision step 554), the mobile number is passed directly to the PBX (step 556) where it is configured to be dialable (step 572). However, if it is determined that the telephony connector has a location (affirmative outcome to decision step 554), the mobile number is inspected to identify and remove any "+" sign (step 560). In addition, the mobile number is inspected to determine if a country code is present (step 562). If there is no country code present (negative outcome to decision step 562), the Country Code from the IMSI field is added to the mobile number (step 564), and otherwise the mobile number is inspected to determine if the country code in the mobile number matches the PBX country location (step 566). If the PBX country location and country code mobile do not match (negative outcome to decision 566), then the required International Direct Dialing Code for the mobile device is retrieved from the telephony connecter and added to the mobile number in the callback dialing sequence (step 568). However, if the PBX country location and country code mobile do match (affirmative outcome to decision 566), then the National Direct Dialing Code is retrieved from the telephony connector and added to the mobile number for the call back dialing sequence (step 570). Thereafter, the mobile number is in a dialable format (step 572), and the process ends.

Figure 7:
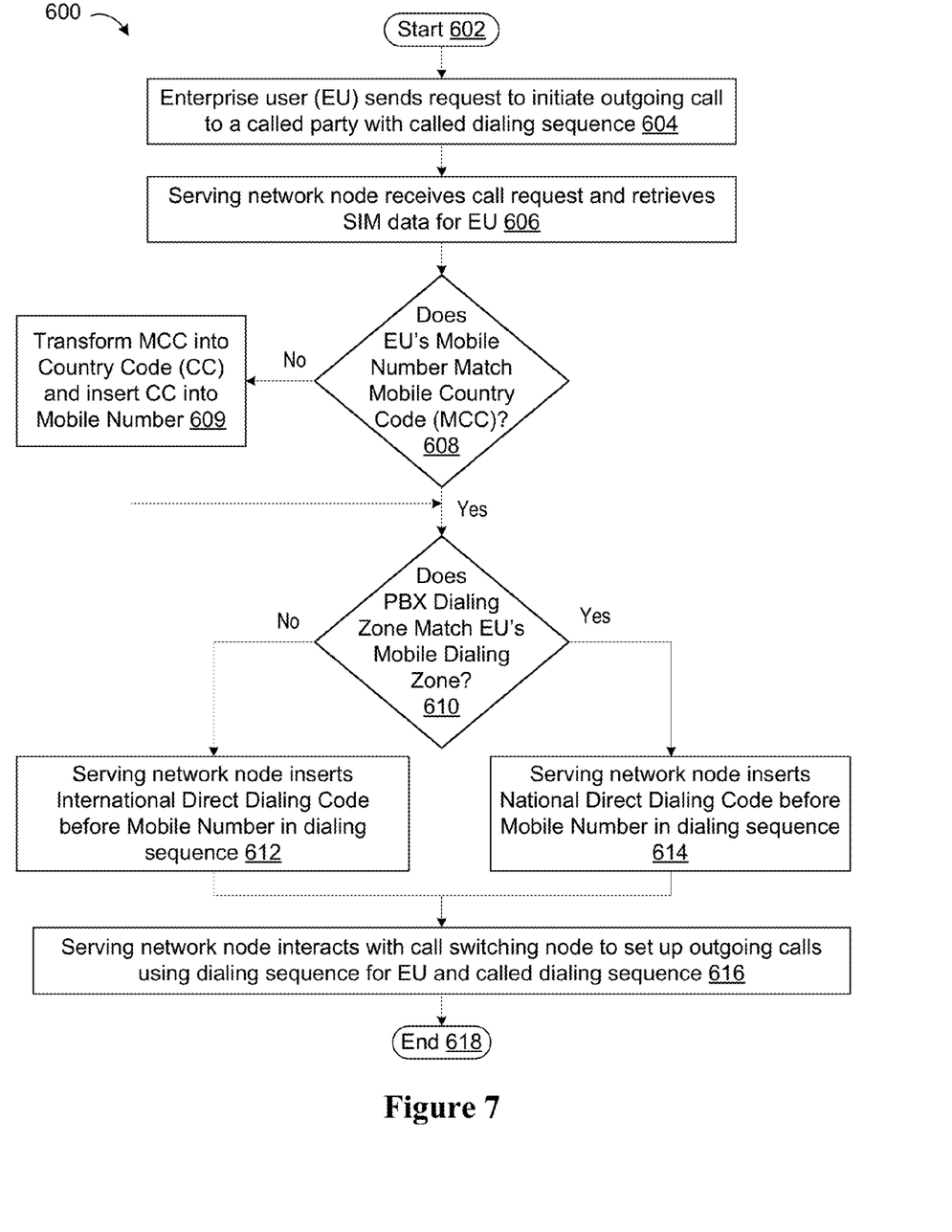
FIG. 7 depicts in flow chart form a procedure for making calls to a mobile device.

With respect to the behavior of the enterprise UE for purposes of facilitating integration of an outgoing cellular call, reference may now be taken to FIG. 7 which depicts in flow chart form a procedure 600 for making external calls to a mobile device. When the procedure starts (step 602), each mobile device associated with an enterprise user (EU) has previously uploaded predetermined subscriber information from the SIM card to the serving network node, such as a mobile voice server or other unified communications platform. The uploaded SIM data includes, but is not limited to, the MSISDN field (which typically, but not always, includes the Country Code) and the IMSI field (which typically includes the Mobile Country Code, Mobile Network Code, and Mobile Station Identification Number).

At step 604, the enterprise user uses the mobile device to send a request message to a serving network node (i.e., the SMP server 18 shown in FIG. 1) via the cellular network's data network or via an intermediate enterprise data server. The request message is sent to initiate an outgoing call from the mobile device to a called party using a called dialing sequence in the request message. In selected embodiments, the request message is a SIP Request or any other message that contains the necessary information to enable the serving network node to establish a call between the EU's mobile device and the called party's equipment that the enterprise user is attempting to call (e.g., an SMS message, an Unstructured Supplementary Service Data (USSD) message, or an IP based message). In accordance with an embodiment, the following pieces of information may be transmitted as part of the request message: (i) the enterprise address (e.g., SIP URI or E.164 number) that the enterprise user is reachable at; (ii) the non-enterprise address (e.g., E.164 number) that the enterprise UE is reachable at when it is attached to the cellular network; (iii) the E.164 number or SIP URI of the called party; and (iv) an indication of whether privacy is required.

Upon receiving the request message from the EU's mobile device (step 606), service logic at the serving network node uses the received information to process the call request by first retrieving SIM data for the EU from a database to verify that the call request is from a registered enterprise user. The verification status may be forwarded to an enterprise server (i.e., the enterprise server 12 shown in FIG. 1). Though not separately shown, the Mobile Number from the retrieved SIM data may be inspected by the serving network node to determine if there is an encoded IMSI value and if there is a telephony connector that has a connection. If not, the Mobile Number is passed directly to a call switching node, but otherwise the Mobile Number may be processed to remove any +sign.

At step 608, the retrieved SIM data for the EU/calling party is processed by the serving network node to determine whether the Mobile Number has an encoded Country Code provided with the Mobile Subscriber Integrated Services Digital Network (MSISDN) number for the mobile device. While a variety of Country Code detection algorithms may be used, the presence or absence of the Country Code may be detected by comparing the mobile number (from the MSISDN field) with the Mobile Country Code (from the IMSI field, where there is a 1:1 match between the IMSI MCC code to the Country Code) to see if there is a match. Alternatively, the MSISDN and IMSI fields may each be parsed to extract information from the Country Code and Mobile Country Code fields, respectively, and then compared to determine if there is a match. If the Mobile Country Code from the IMSI field matches the Country Code prefix from the MSISDN field (affirmative outcome to decision 608), this indicates that the SIM data for the mobile device was encoded with the Country Code, and the serving network node proceeds to service the call request by inserting any required national or international dialing code prefixes.

In selected embodiments, the serving network node services the call request by establishing two dialogs in association with a call switching node, such as a PBX node. In this case, the serving network node sets up a first dialog between the PBX node and the EU/calling party, and a second dialog between the PBX node and the called party so that the EU's enterprise address is presented to the called party. To establish the first dialog, the serving network node determines if the PBX node and EU's mobile device are in the same dialing zone at step 610. If the PBX node and mobile device are in different dialing zones (negative outcome to decision 610), then the serving network node inserts the required International Direct Dialing Code for the EU's mobile device before the mobile number in the dialing sequence for the first leg (step 612). However, if the PBX node and mobile device are in the same dialing zone (affirmative outcome to decision 610), then the serving network node inserts the required National Direct Dialing Code for the EU's mobile device before the mobile number in the dialing sequence for the first leg (step 614). Thereafter, the serving network node interacts with the call switching node at step 616 to set up the first and second dialogs and patch the dialogs or call legs together using the dialing sequence to the EU's mobile device for the first leg (to the EU's mobile device) and the called dialing sequence for the second leg in order to establish an end-to-end bearer communications path between the enterprise user and the called party. At step 618, the process ends.

When the SIM card of a mobile device is not encoded with the Country Code, this may be detected by the serving network node from the retrieved SIM data for the EU/calling party (negative outcome to decision 608), such as by determining that there is not a match between the MSISDN number for the mobile device and the Mobile Country Code (from the IMSI field). Again, this determination may be performed by parsing the MSISDN and IMSI fields to extract information from the Country Code (CC) and Mobile Country Code (MCC) fields, respectively, and then comparing the CC and MCC fields. If there is not match, this indicates that the SIM data for the mobile device was not encoded with the Country Code.

To derive the missing country code information, the serving network node may be configured to transform the Mobile Country Code into a corresponding Country Code and then insert the constructed Country Code into the mobile number (step 609). In selected embodiments, the transformation is performed by reading the IMSI value from the EU's SIM data, extracting the Mobile Country code (MCC), and then translating the MCC value into a Country Code value for the EU that can be stored as part of the mobile number with the EU's SIM data. The translation process may be implemented by using the MCC value to access a lookup table of Country Code values. Alternatively, the Mobile Country Code from the IMSI may be added to the Mobile Number. Once the constructed Country Code is inserted into the mobile number, the serving network node proceeds to service the call request by inserting any required national or international dialing code prefixes as described hereinabove with reference to steps 610-618.

Figure 8:
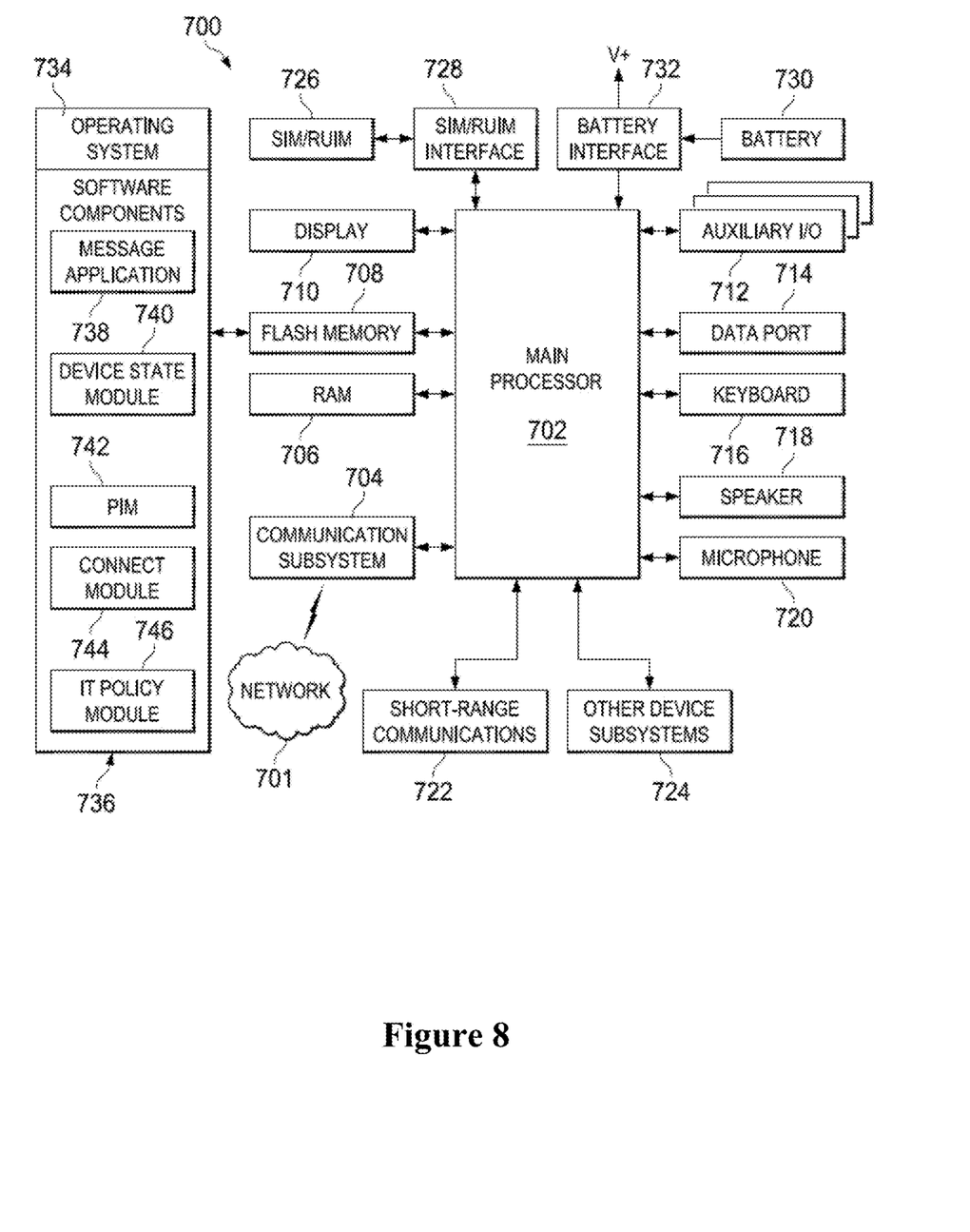
FIG. 8 is a block diagram of a mobile communications device which may be used with selected embodiments of the present disclosure.

Referring now to FIG. 8, there is shown a schematic block diagram illustrating exemplary components of a mobile wireless communications or user equipment device 700 which may be used with selected embodiments of the present disclosure. The wireless device 700 is shown with specific components for implementing features described above. It is to be understood that the wireless device 700 is shown with very specific details for exemplary purposes only. As depicted, user equipment 700 includes a number of components such as a main processor 702 that controls the overall operation of user equipment 700. Communication functions, including data and voice communications, are performed through a communication subsystem 704. The communication subsystem 104 receives messages from and sends messages to a wireless network 701. In this illustrative embodiment of user equipment 700, communication subsystem 704 is configured in accordance with the Global System for Mobile Communication (GSM) and General Packet Radio Services (GPRS) standards. The GSM/GPRS wireless network is used worldwide and these standards may be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 704 with the wireless network 701 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 701 associated with user equipment 700 is a GSM/GPRS wireless network in one implementation, other wireless networks may also be associated with user equipment 700 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future generation networks like EDGE, UMTS, WiMAX, LTE and LTE-A. Some other examples of data-centric networks include WiFi 802.11, Mobitex™ and DataTA™ network communication systems. Examples of other voice-centric data networks include Personal Communication Systems (PCS) networks like GSM and Time Division Multiple Access (TDMA) systems.

The main processor 702 also interacts with additional subsystems such as a Random Access Memory (RAM) 706, a flash memory 708, a display 710, an auxiliary input/output (I/O) subsystem 712, a data port 714, a keyboard 716, a speaker 718, a microphone 720, short-range communications 722, and other device subsystems 724.

Some of the subsystems of the user equipment 700 perform communication-related functions, whereas other subsystems may provide "resident" or on-device functions. By way of example, the display 710 and the keyboard 716 may be used for both communication-related functions, such as entering a text message for transmission over the network 701, and device-resident functions such as a calculator or task list.

The user equipment 700 can send and receive communication signals over the wireless network 701 after required network registration or activation procedures have been completed. Network access is associated with a subscriber or user of the user equipment 700. To identify a subscriber, the user equipment 700 requires a SIM/RUIM card 726 (i.e. Subscriber Identity Module or a Removable User Identity Module) to be inserted into a SIM/RUIM interface 728 in order to communicate with a network. The SIM card or RUIM 726 is one type of a conventional "smart card" that can be used to identify a subscriber of the user equipment 700 and to personalize the user equipment 700, among other things. Without the SIM card 726, the user equipment 700 is not fully operational for communication with the wireless network 701. By inserting the SIM card/RUIM 726 into the SIM/RUIM interface 728, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 726 includes a processor and memory for storing information. Once the SIM card/RUIM 726 is inserted into the SIM/RUIM interface 728, it is coupled to the main processor 702. In order to identify the subscriber, the SIM card/RUIM 726 can include some user parameters such as a Mobile Subscriber Integrated Services Digital Network (MSISDN) number and an International Mobile Subscriber Identity (IMSI) number. An advantage of using the SIM card/RUIM 726 is that a subscriber is not necessarily bound by any single physical user equipment. The SIM card/RUIM 726 may store additional subscriber information for user equipment as well, including datebook (or calendar) information and recent call information. Alternatively, user identification information can also be programmed into the flash memory 708. In cases where the SIM card/RUIM 726 does not include a Country Code parameter in the MSISDN number required for placing calls to the user equipment 700, the serving network node which sets up a call to the user equipment 700 may be configured to extract a Mobile Country Code from the IMSI number which is translated or appended to define a reconstructed Country Code for calls to the user equipment 700 over the wide-area cell network 701.

The user equipment 700 is a battery-powered device and includes a battery interface 732 for receiving one or more rechargeable batteries 730. In at least some embodiments, the battery 730 can be a smart battery with an embedded microprocessor. The battery interface 732 is coupled to a regulator (not shown), which assists the battery 730 in providing power V+ to the user equipment 700. Although current technology makes use of a battery, future technologies such as micro fuel cells may provide the power to the user equipment 700.

The user equipment 700 also includes an operating system 734 and software components 736 which are described in more detail below. The operating system 734 and the software components 736 that are executed by the main processor 702 are typically stored in a persistent store such as the flash memory 708, which may alternatively be a read-only memory (ROM) or similar storage element (not shown). Those skilled in the art will appreciate that portions of the operating system 734 and the software components 736 such as specific device applications, or parts thereof, may be temporarily loaded into a volatile store such as the RAM 706. Other software components can also be included, as is well known to those skilled in the art.

The subset of software components 736 that control basic device operations, including data and voice communication applications, will normally be installed on the user equipment 700 during its manufacture. Other software applications include a message application 738 that can be any suitable software program that allows a user of the user equipment 700 to send and receive electronic messages. Various alternatives exist for the message application 738 as is well known to those skilled in the art. Messages that have been sent or received by the user are typically stored in the random access or flash memory 708 of the user equipment 700 or some other suitable storage element in the user equipment 700. In at least some embodiments, some of the sent and received messages may be stored remotely from the device 700 such as in a data store of an associated host system that the user equipment 700 communicates with.

The software applications can further include a device state module 740, a Personal Information Manager (PIM) 742, and other suitable modules (not shown). The device state module 740 provides persistence, i.e. the device state module 740 ensures that important device data is stored in persistent memory, such as the flash memory 708, so that the data is not lost when the user equipment 700 is turned off or loses power.

The PIM 742 includes functionality for organizing and managing data items of interest to the user, such as, but not limited to, e-mail, contacts, calendar events, voice mails, appointments, and task items. A PIM application has the ability to send and receive data items via the wireless network 701. PIM data items may be seamlessly integrated, synchronized, and updated via the wireless network 701 with the user equipment subscriber's corresponding data items stored or associated with a host computer system. This functionality creates a mirrored host computer on the user equipment 700 with respect to such items. This can be particularly advantageous when the host computer system is the user equipment subscriber's office computer system.

The user equipment 700 also includes a connect module 744, and an IT policy module 746. The connect module 744 implements the communication protocols that are required for the user equipment 700 to communicate with the wireless infrastructure and any host system, such as an enterprise system, that the user equipment 700 is authorized to interface with.

The connect module 744 includes a set of APIs that can be integrated with the user equipment 700 to allow the user equipment 700 to use any number of services associated with the enterprise system. The connect module 744 allows the user equipment 700 to establish an end-to-end secure, authenticated communication pipe with the host system. A subset of applications for which access is provided by the connect module 744 can be used to pass IT policy commands from the host system to the user equipment 700. This can be done in a wireless or wired manner. These instructions can then be passed to the IT policy module 746 to modify the configuration of the device 700. Alternatively, in some cases, the IT policy update can also be done over a wired connection.

The IT policy module 746 receives IT policy data that encodes the IT policy. The IT policy module 746 then ensures that the IT policy data is authenticated by the user equipment 700. The IT policy data can then be stored in the flash memory 708 in its native form. After the IT policy data is stored, a global notification can be sent by the IT policy module 746 to all of the applications residing on the user equipment 700. Applications for which the IT policy may be applicable then respond by reading the IT policy data to look for IT policy rules that are applicable.

The IT policy module 746 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 746 can determine which applications are affected by the IT policy data and send a notification to only those applications. In either of these cases, for applications that aren't running at the time of the notification, the applications can call the parser or the IT policy module 746 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore, the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 746 sends an acknowledgement back to the host system to indicate that the IT policy data was received and successfully applied.

Other types of software applications can also be installed on the user equipment 700. These software applications can be third party applications, which are added after the manufacture of the user equipment 700. Examples of third party applications include games, calculators, utilities, etc.

The additional applications can be loaded onto the user equipment 700 through at least one of the wireless network 701, the auxiliary I/O subsystem 712, the data port 714, the short-range communications subsystem 722, or any other suitable device subsystem 724. This flexibility in application installation increases the functionality of the user equipment 700 and may provide enhanced on-device functions, communication-related functions, or both. For example, secure communication applications may enable electronic commerce functions and other such financial transactions to be performed using the user equipment 700.

The data port 714 enables a subscriber to set preferences through an external device or software application and extends the capabilities of the user equipment 700 by providing for information or software downloads to the user equipment 700 other than through a wireless communication network. The alternate download path may, for example, be used to load an encryption key onto the user equipment 700 through a direct, and thus reliable and trusted connection, to provide secure device communication.

The data port 714 can be any suitable port that enables data communication between the user equipment 700 and another computing device. The data port 714 can be a serial or a parallel port. In some instances, the data port 714 can be a USB port that includes data lines for data transfer and a supply line that can provide a charging current to charge the battery 730 of the user equipment 700.

The short-range communications subsystem 722 provides for communication between the user equipment 700 and different systems or devices, without the use of the wireless network 701. For example, the subsystem 722 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 704 and input to the main processor 702. The main processor 702 will then process the received signal for output to the display 710 or alternatively to the auxiliary I/O subsystem 712. A subscriber may also compose data items, such as e-mail messages, for example, using the keyboard 716 in conjunction with the display 710 and possibly the auxiliary I/O subsystem 712. The auxiliary subsystem 712 may include devices such as: a touch screen, mouse, track ball, infrared fingerprint detector, or a roller wheel with dynamic button pressing capability. The keyboard 716 is preferably an alphanumeric keyboard or telephone-type keypad. However, other types of keyboards may also be used. A composed item may be transmitted over the wireless network 200 through the communication subsystem 704.

For voice communications, the overall operation of the user equipment 700 is substantially similar, except that the received signals are output to the speaker 718, and signals for transmission are generated by the microphone 720. Alternative voice or audio I/O subsystems, such as a voice message recording subsystem, can also be implemented on the user equipment 700. Although voice or audio signal output is accomplished primarily through the speaker 718, the display 710 can also be used to provide additional information such as the identity of a calling party, duration of a voice call, or other voice call related information.

Figure 9:
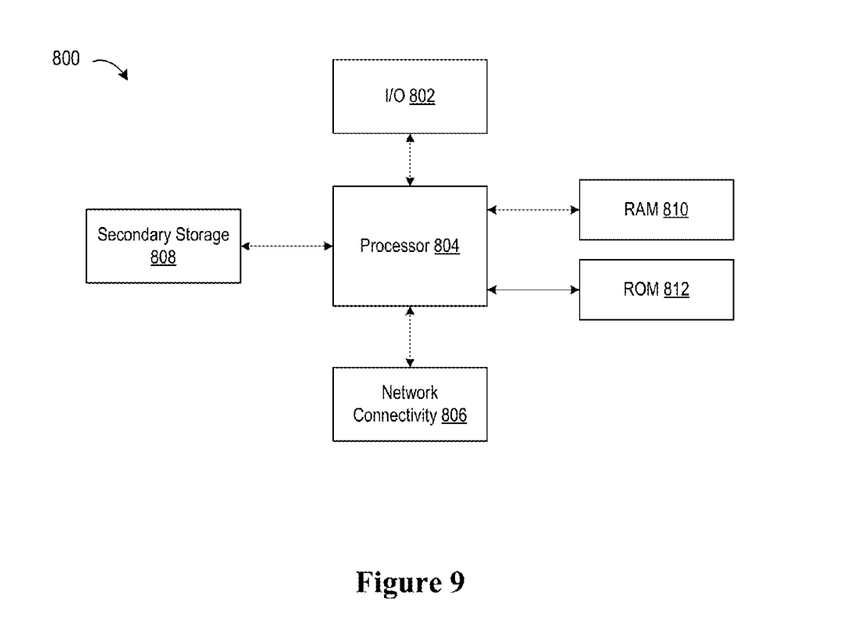
FIG. 9 illustrates an example computer system that may be suitable for setting up an external call at a serving network node to a mobile device.

The mobile device, enterprise communications platform, and serving network node elements described herein may include any general or special purpose computer with sufficient processing power, memory resources, and network throughput capability to handle the necessary workload placed upon it. FIG. 9 illustrates an example computer system 800 that may be suitable for implementing one or more embodiments disclosed herein. The computer system 800 includes a processor 804 (which may be referred to as a central processor unit or CPU) that is in communication with input/output (I/O) devices 802, network connectivity devices 806, an optional secondary storage 808, random access memory (RAM) 810, and read only memory (ROM) 812. The processor may be implemented as one or more CPU chips.

The secondary storage 808 is optionally included for storing SIM data from one or more enterprise users, and typically includes one or more disk drives or tape drives used for non-volatile storage of data and/or for over-flow data storage device if RAM 810 is not large enough to hold all working data. Secondary storage 808 may be used to store programs which are loaded into RAM 810 when such programs are selected for execution. The ROM 812 is used to store instructions and perhaps data which are read during program execution. ROM 812 is a non-volatile memory device which typically has a small memory capacity relative to the larger memory capacity of secondary storage. The RAM 810 is used to store volatile data and perhaps to store instructions. Access to both ROM 812 and RAM 810 is typically faster than to secondary storage 808.

I/O devices 802 may include on or more printers, video monitors, liquid crystal displays (LCDs), touch screen displays, keyboards, keypads, switches, dials, mice, track balls, voice recognizers, card readers, paper tape readers, or other well-known input devices.

The network connectivity devices 806 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 806 devices may enable the processor 804 to communicate with an Internet or one or more intranets. With such a network connection, it is contemplated that the processor 804 might receive information from the network, or might output information to the network in the course of performing the above-described method steps. Such information, which is often represented as a sequence of instructions to be executed using processor 804, may be received from and outputted to the network, for example, in the form of a computer data signal embodied in a carrier wave or a non-transitory computer readable storage medium, such as RAM, ROM or other memory storage devices.

Such information, which may include data or instructions to be executed using processor 804 for example, may be received from and outputted to the network, for example, in the form of a computer data baseband signal or signal embodied in a carrier wave. The baseband signal or signal embodied in the carrier wave generated by the network connectivity 806 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 804 executes instructions, codes, computer programs, scripts which it accesses from hard disk, floppy disk, optical disk (these various disk-based systems may all be considered secondary storage 808), ROM 812, RAM 810, or the network connectivity devices 806. While only one processor 804 is shown, multiple processors may be present. Thus, while instructions may be discussed as executed by a processor, the instructions may be executed simultaneously, serially, or otherwise executed by one or multiple processors. In addition or in the alternative, any required processing functionality may be executed by a cryptographic engine or other hardware accelerator circuit (not shown).

Figure 10:
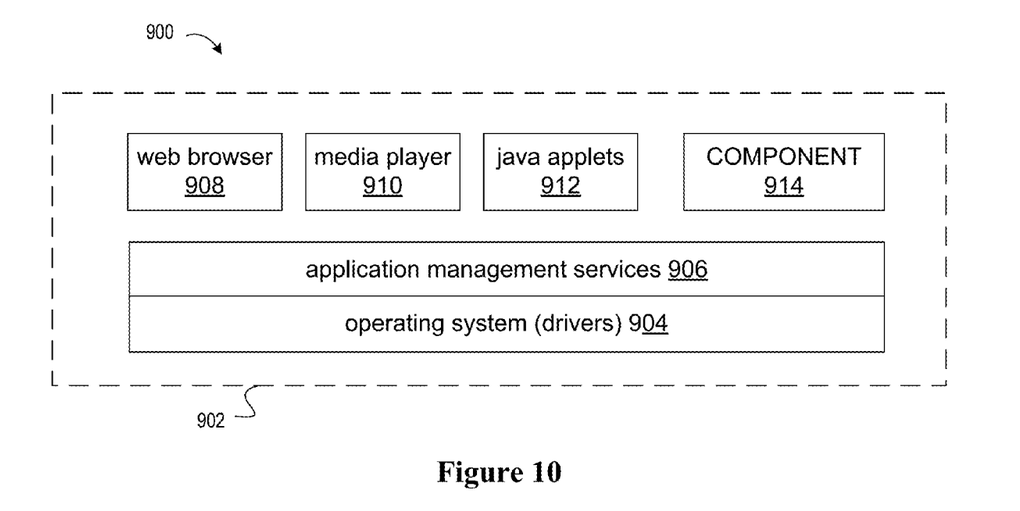
FIG. 10 is a diagram of a software environment that may be implemented on a mobile device and/or serving network node operable for some of the various embodiments of the disclosure.

FIG. 10 is a diagram of a software environment 900 that may be implemented on a communication device, enterprise communications platform, and/or serving network node elements operable for some of the various embodiments of the disclosure. As illustrated, one or more processing resources execute operating system drivers 904 that provide a platform from which the rest of the software operates. The operating system drivers 904 provide drivers for the device hardware with standardized interfaces that are accessible to application software. The operating system drivers 904 include application management services ("AMS") 906 that transfer control between applications running on the device. In UE instances, the software environment 902 includes a web browser application 908, a media player application 910, and Java applets 912 are provided as device applications. The web browser application 908 configures the UE device to operate as a web browser, allowing a user to enter information into forms and select links to retrieve and view web pages. The media player application 910 configures the UE to retrieve and play audio or audiovisual media. The Java applets 912 configure the UE device to provide games, utilities, and other functionality. Finally, the component 914 may provide the call processing functionality described herein.

By now it should be appreciated that there is disclosed herein a method, apparatus, computer program product, and system for facilitating integration of an outgoing cellular call as an enterprise call. As disclosed, a request is received at a communication control server for an outgoing cellular call from an enterprise user towards a called party where the enterprise user is attached to an external wide area cellular network via a mobile communications device. The communication control server retrieves a mobile number (e.g., a MSISDN number with a CC field) and an International Mobile Subscriber Identity (IMSI) value from subscriber identity module (SIM) data associated with the enterprise user, and then generates a derived Country Code value from the IMSI value if the mobile number for the enterprise user does not include a Country Code value. In selected embodiments, the derived Country Code value is generated by extracting a Mobile Country Code value from the IMSI value, and then using the MCC value to access a table of Country Code values to retrieve the derived Country Code value. The derived Country Code value is added to the mobile number to generate at least part of a first dialing sequence to the mobile communications device. In addition, an International Direct Dialing code may be added to the first dialing sequence if the derived country code does not match a dialing zone for a call switching node which will establish a first dialog to the mobile communications device using the first dialing sequence. Alternatively, a National Direct Dialing code may be added to the first dialing sequence if the derived country code matches a dialing zone for a call switching node which will establish a first dialog to the mobile communications device using the first dialing sequence. As finally constructed, the first dialing sequence is sent to a Private Branch eXchange (PBX) which will establish a first dialog to the mobile communications device using the first dialing sequence. In addition, the communication control server may generate a second dialing sequence to the called party, and then send the first and second dialing sequences to a call switching node for establishing a first dialog to the mobile communications device using the first dialing sequence and a second dialog to the called party using the second dialing sequence such that the second dialog contains an enterprise address of the enterprise user as a calling line identity.

There is also disclosed herein a method, apparatus, computer program product, and system for making an enterprise call from a mobile device attached to an external wide area cellular network. As disclosed, a communications server receives a request from an enterprise user to initiate an external call from the mobile device to a called party. In response to the request, the communications server determines if a mobile number from subscriber identity module (SIM) data associated with the enterprise includes a Country Code value. If not, the communications server constructs an updated mobile number by generating a derived Country Code value and adding the derived Country Code value to the mobile number. The updated mobile number may be constructed by retrieving a mobile number and MSISDN Number from SIM data associated with the enterprise user, determining whether the mobile number (e.g., MSISDN Number) from the SIM card data includes a Country Code value, retrieving an International Mobile Subscriber Identity (IMSI) value from the SIM data associated with the enterprise user if the mobile/MSISDN number from the SIM card data does not a Country Code value, and constructing the updated mobile number by generating a derived Country Code value from the IMSI value and adding the derived Country Code value to the mobile number. In selected embodiments, the updated mobile number is constructed by extracting an MCC value from the IMSI value and adding the MCC value to the mobile number. In addition, if the mobile number includes a "+" sign, the "+" sign is removed during construction of the updated mobile number. If the derived Country Code value does not match a country location indicator for a call switching node which will call the mobile device, an International Direct Dialing code is added during construction of the updated mobile number. However, if the derived Country Code value matches a country location indicator for a call switching node which will call the mobile device, a National Direct Dialing code is added during construction of the updated mobile number. The communications server uses the updated mobile number to establish a first call leg to said enterprise user by sending a circuit-switched call using the updated mobile number, and also establishes a second call leg to said called party upon receiving an indication that said first call leg has been established. Finally, the first and second call legs are patched together to establish an end-to-end communications path between the enterprise user and the called party.

In still further embodiments, there is disclosed a network node for making an outgoing cellular call as an enterprise call originated by an enterprise user towards a called party when said enterprise user is attached to an external wide area cellular network via a mobile communications device. The disclosed network node includes or has access to a memory or database for storing subscriber identity module (SIM) data associated with the enterprise user, including but not limited to a mobile number, MSISDN Number, and IMSI value. The network node also includes one or more processors configured to execute programming code and/or instructions to place the outgoing cellular call. In selected embodiments, the processor(s) are programmed to determine if a Mobile Subscriber Integrated Services Digital Network (MSISDN) Number in the SIM data includes a Country Code value. The processor(s) are also programmed to generate a derived Country Code value if the MSISDN Number for the enterprise user does not include a Country Code value. The derived Country Code may be generated by retrieving an International Mobile Subscriber Identity (IMSI) value from the SIM data stored in the memory, and then constructing the updated mobile number by generating a derived Country Code value from the IMSI value and adding the derived Country Code value to the mobile number. In addition, the processor(s) are programmed to construct an updated mobile number by adding the derived Country Code value to a mobile number from the SIM data associated with the enterprise user. The updated mobile number may be constructed by extracting a Mobile Country Code (MCC) value from the IMSI value, and adding the MCC value to the mobile number. Finally, the processor(s) are programmed to establish a first dialing sequence for a call to said enterprise user by sending a circuit-switched call using the updated mobile number.

Although the described exemplary embodiments disclosed herein are described with reference to using the Mobile Country Code number from the IMSI SIM data field to derive missing Country Code SIM values in the context of a mobile terminated call, the present disclosure is not necessarily limited to the example embodiments which illustrate inventive aspects of the present disclosure that are applicable to a wide variety of authentication algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A network node comprising:
   a memory for storing subscriber identity module (SIM) data associated with at least one enterprise user; and
   one or more processors configured to execute programming code and/or instructions to place an outgoing cellular call by:
      receiving a request with a first dialing sequence compatible with a Private Branch eXchange (PBX) to initiate the outgoing cellular call, the outgoing cellular call originated by an enterprise user towards a called party when the enterprise user is attached to an external wide area cellular network via a mobile communications device;
      retrieving a Mobile Subscriber Integrated Services Digital Network (MSISDN) Number in the SIM data,
      retrieving an International Mobile Subscriber Identity (IMSI) value in the SIM data;
      generating a derived Country Code value from an International Mobile Subscriber Identity (IMSI) if the MSISDN Number for the enterprise user does not include a Country Code value,
      constructing an updated mobile number by adding the derived Country Code value to a mobile number from the SIM data associated with the enterprise user, and
      establishing a second dialing sequence for a call to the enterprise user by sending a circuit-switched call using the updated mobile number.

2. The network node of claim 1, where
   retrieving an International Mobile Subscriber Identity (IMSI) value in the SIM data includes removing a plus sign from a mobile number of the mobile communications device.

3. The network node of claim 1, where the one or more processors are configured to construct the updated mobile number by:
   extracting a Mobile Country Code (MCC) value from the IMSI value, and
   adding the MCC value to the mobile number.

4. A method for facilitating integration of an outgoing cellular call as an enterprise call, comprising
   receiving a request for an outgoing cellular call from an enterprise user towards a called party where the enterprise user is attached to an external wide area cellular network via a mobile communications device;
   retrieving a mobile number and an International Mobile Subscriber Identity (IMSI) value from subscriber identity module (SIM) data associated with the enterprise user;
   generating a derived Country Code value from the IMSI value if the mobile number for the enterprise user does not include a Country Code value;
   adding the derived Country Code value to the mobile number to generate at least part of a first dialing sequence to the mobile communications device;
   generating a second dialing sequence to the called party; and
   sending the first dialing sequence and the second dialing sequence to a call switching node for establishing a first call leg to the mobile communications device using the first dialing sequence and a second call leg to the called party using the second dialing sequence such that the second call leg contains an enterprise address of the enterprise user as a calling line identity.

5. The method of claim 4, further comprising adding an International Direct Dialing code to the first dialing sequence if the derived country code does not match a dialing zone for a call switching node which will establish a first call leg to the mobile communications device using the first dialing sequence.

6. The method of claim 4, further comprising adding a National Direct Dialing code to the first dialing sequence if the derived country code matches a dialing zone for a call switching node which will establish a first call leg to the mobile communications device using the first dialing sequence.

7. The method of claim 4, further comprising sending the first dialing sequence to a Private Branch eXchange (PBX) which will establish a first call leg to the mobile communications device using the first dialing sequence.

8. The method of claim 4, where retrieving the mobile number comprises retrieving a Mobile Subscriber Integrated Services Digital Network (MSISDN) Number comprising a Country Code field from SIM data associated with the enterprise user.

9. The method of claim 4, where generating the derived Country Code value comprises extracting a Mobile Country Code (MCC) value from the IMSI value.

10. The method of claim 9, where generating the derived Country Code value comprises using the MCC value to access a table of Country Code values to retrieve the derived Country Code value.

11. The method of claim 4,
wherein the retrieving an International Mobile Subscriber Identity (IMSI) value in the SIM data includes removing a plus sign from a mobile number of the mobile communications device.

12. A method for making an enterprise call from a mobile device attached to an external wide area cellular network, comprising:
receiving a request from an enterprise user to initiate an external call from the mobile device to a called party; and
constructing an updated mobile number when a mobile number from subscriber identity module (SIM) data associated with the enterprise user does not include a Country Code value by generating a derived Country Code value and adding the derived Country Code value to the mobile number;
establishing a first call leg to the enterprise user by sending a circuit-switched call using the updated mobile number;
establishing a second call leg to the called party upon receiving an indication that the first call leg has been established; and
patching the first call leg and the second call to establish an end-to-end communications path between the enterprise user and the called party.

13. The method of claim 12, where constructing the updated mobile number comprises:
retrieving a mobile number from SIM data associated with the enterprise user;
determining whether the mobile number from the SIM card data includes a Country Code value;
retrieving an International Mobile Subscriber Identity (IMSI) value from the SIM data associated with the enterprise user if the mobile number from the SIM card data does not a Country Code value; and
constructing the updated mobile number by generating a derived Country Code value from the IMSI value and adding the derived Country Code value to the mobile number.

14. The method of claim 13, where retrieving the mobile number comprises retrieving a Mobile Subscriber Integrated Services Digital Network (MSISDN) Number from the SIM data associated with the enterprise user.

15. The method of claim 14, where determining whether the mobile number from the SIM card data includes the Country Code value comprises determining whether the MSISDN Number includes a Country Code.

16. The method of claim 13, where constructing the updated mobile number comprises extracting a Mobile Country Code (MCC) value from the IMSI value and adding the MCC value to the mobile number.

17. The method of claim 13, further comprising:
wherein the retrieving an International Mobile Subscriber Identity (IMSI) value in the SIM data includes removing a plus sign from a mobile number of the mobile device.

18. The method of claim 12, where constructing the updated mobile number comprises removing a "+" sign from the mobile number.

19. The method of claim 12, where constructing the updated mobile number comprises adding an International Direct Dialing code to the updated mobile number if the derived Country Code value does not match a country location indicator for a call switching node which will call the mobile device.

20. The method of claim 12, where constructing the updated mobile number comprises adding a National Direct Dialing code to the updated mobile number if the derived Country Code value matches a country location indicator for a call switching node which will call the mobile device.

* * * * *